United States Patent
Dickinson, Jr. et al.

(10) Patent No.: US 6,345,519 B1
(45) Date of Patent: *Feb. 12, 2002

(54) METHOD OF REDUCING BREAK SOURCES IN DRAWN FIBERS BY ACTIVE OXIDATION OF CONTAMINANTS IN A REDUCING ATMOSPHERE

(75) Inventors: James E. Dickinson, Jr.; G. Scott Glaesemann, both of Corning, NY (US); James A. Snipes, Wilmington, NC (US); Tinghong Tao, Big Flats; Donald J. Wissuchek, Jr., Horseheads, both of NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,680

(22) PCT Filed: Oct. 3, 1997

(86) PCT No.: PCT/US97/18039

§ 371 Date: Jun. 15, 1999

§ 102(e) Date: Jun. 15, 1999

(87) PCT Pub. No.: WO98/18735

PCT Pub. Date: May 7, 1998

Related U.S. Application Data

(60) Provisional application No. 60/029,469, filed on Oct. 25, 1996.

(51) Int. Cl.$^7$ ............................................. C03B 37/07
(52) U.S. Cl. .................. 65/426; 65/435; 65/3; 65/379
(58) Field of Search ........................... 65/435, 426, 379

(56) References Cited

U.S. PATENT DOCUMENTS

| | | | |
|---|---|---|---|
| 3,881,902 A | | 5/1975 | DeLuca |
| 4,040,807 A | * | 8/1977 | Midwinter |
| 4,154,592 A | * | 5/1979 | Bailey |
| 4,236,930 A | | 12/1980 | Macedo et al. |
| 4,659,354 A | * | 4/1987 | Roba |
| 4,735,826 A | * | 4/1988 | Roba |
| 4,741,752 A | * | 5/1988 | France |
| 4,810,276 A | * | 3/1989 | Gilliland |
| 4,854,956 A | | 8/1989 | Pluijms et al. |
| 5,059,229 A | * | 10/1991 | Blankenship |
| 5,157,747 A | * | 10/1992 | Aktins |
| 5,284,499 A | * | 2/1994 | Harvey |
| 5,318,613 A | * | 6/1994 | Amos |
| 5,735,921 A | * | 4/1998 | Araujo |

FOREIGN PATENT DOCUMENTS

| | | |
|---|---|---|
| DE | 3635819 | 5/1988 |
| JP | 57-191244 | 11/1982 |
| JP | 60-122743 | 7/1985 |
| JP | 60-231439 | 11/1985 |
| JP | 63-40740 | 2/1988 |

* cited by examiner

Primary Examiner—John Hoffmann
(74) Attorney, Agent, or Firm—Edward F. Murphy; Robert L. Carlson; Randall S. Wayland

(57) ABSTRACT

In connection with drawing a fiber in a drawing portion of a drawing device having a refractory, oxide component, a method and apparatus provide an environment in the drawing portion that causes active oxidation of a refractory contaminant on a blank. The active oxidation of the refractory contaminant causes it to corrode away during drawing.

44 Claims, 2 Drawing Sheets

METHOD OF REDUCING BREAK SOURCES IN DRAWN FIBERS BY ACTIVE OXIDATION OF CONTAMINANTS IN A REDUCING ATMOSPHERE

This is a 35 U.S.C. §371 application which claims the benefit of and priority to PCT/US97/18039 filed Oct. 3, 1997 and US provisional patent application 60/029,469 filed Oct. 25, 1996.

BACKGROUND OF THE INVENTION

1. Field of the Invention

The present invention relates to a method and apparatus for drawing a fiber from a blank, more particularly, a method and apparatus for drawing an optical waveguide fiber from a silica-containing blank.

2. Description of the Related Art

Optical waveguide fibers (optical fibers) are a transmission medium used in optical communication systems. Optical fibers are typically made by well known methods that involve forming blanks from which the fibers are to be drawn, storing the blanks in holding ovens, and drawing fibers from the blanks in draw furnaces.

Strength is an important characteristic of optical fibers. Particulate contaminants on the fiber surface often weaken the fiber and cause flaw initiation and fiber failure under tensile loading. Some optical fibers, particularly those drawn in zirconia ($ZrO_2$) muffle furnaces, break under low stress due to such contaminants.

SUMMARY OF THE INVENTION

An object of the present invention is to improve the strength of fibers.

Another object of the invention is to remove break sources that cause fibers to break at low stress.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

As explained more fully below, it has been determined that breaking optical fibers contain silicon carbide (SiC) and silicon nitride ($Si_3N_4$) refractory contaminants that cause the fibers to fail at low stress. The present invention improves the strength of fibers by removing the contaminants through active oxidation during the fiber-drawing process.

To achieve the objects and in accordance with the purpose of the invention, as broadly described herein, the invention provides an improved method of producing a fiber in a drawing device having a refractory, oxide component in a drawing portion, comprising the steps of disposing a blank having a refractory contaminant in the drawing portion, providing an environment in the drawing portion that causes active oxidation of the refractory contaminant, and drawing a fiber from the blank in the environment.

The invention also provides an improved apparatus for producing a fiber, comprising a drawing portion that has a refractory, oxide component and that heats a blank having a refractory contaminant, a supply device that supplies gas to the drawing portion to provide an environment in the drawing portion that causes active oxidation of the refractory contaminant, and a device for drawing a fiber from the blank in the environment.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

DESCRIPTION OF THE PREFERRED EMBODIMENT

Figure 1:
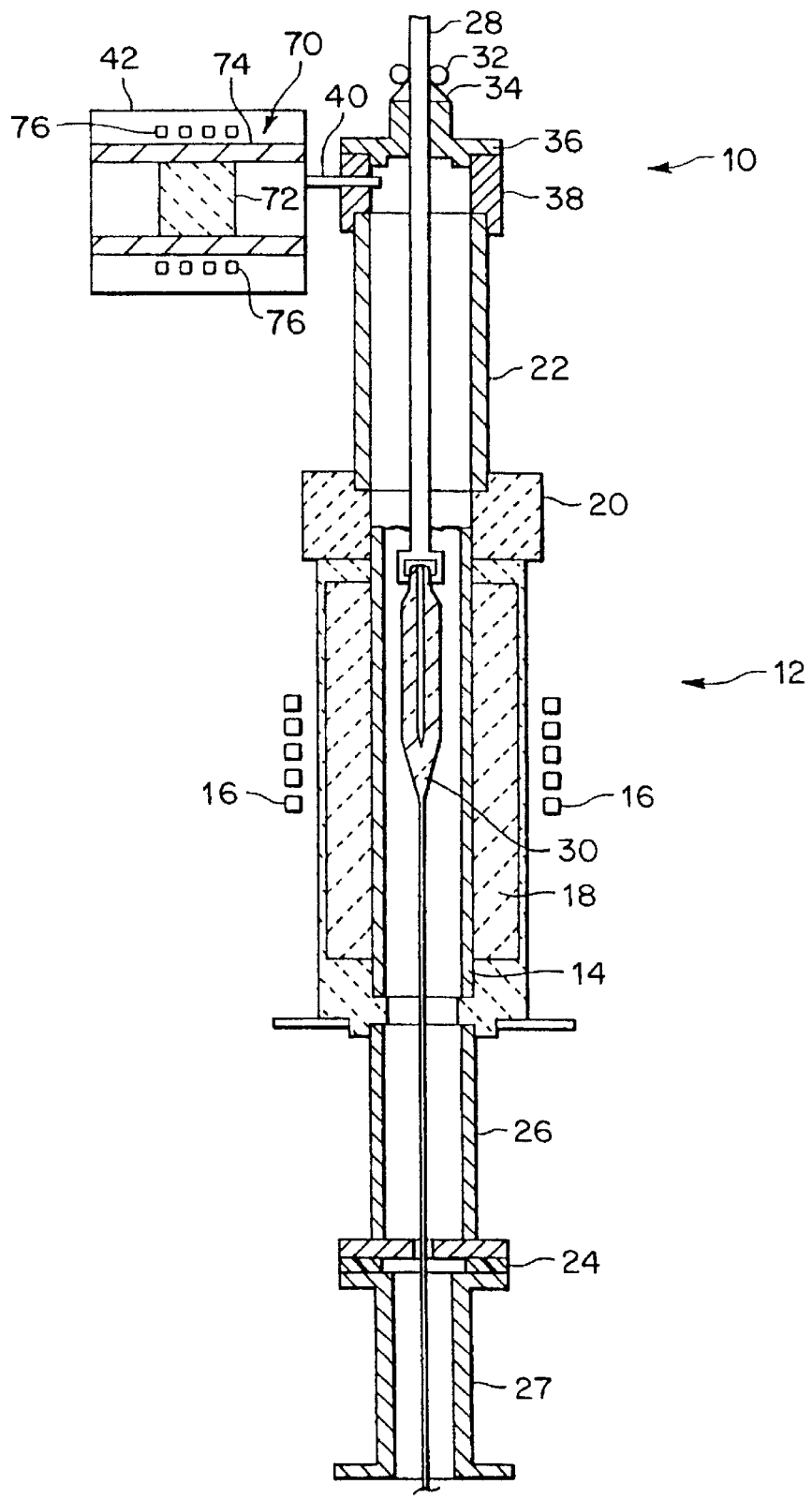
FIG. 1 is a sectional view of a preferred embodiment of a draw furnace according to the present invention.

Reference will now be made in detail to the presently preferred embodiment of the invention, an example of which is illustrated in the accompanying drawings. Wherever possible, the same reference numbers will be used throughout the drawings to refer to the same or like parts.

It has been discovered, in connection with the present invention, that the fibers drawn in conventional zirconia muffle furnaces that break under low stress contain silicon carbide and silicon nitride, which are non-oxide, refractory contaminants. These contaminants are in the size range typical of airborne particles (less than 5 $\mu$m) and attach to the surface of the blank before or during the drawing process, thus producing a draw trough on the surface of the fiber.

It has also been discovered that each contaminant has an adhered passivation layer of amorphous silica ($SiO_2$) formed thereon, at least in part, due to the environment in a conventional zirconia muffle furnace. The passivation layer is a solid reaction product of passive oxidation. The passive oxidation mechanisms for silicon carbide and silicon nitride are represented by the following formulas:

$$(2)SiC+(3)O_2 \rightarrow (2)SiO_2(s)+(2)CO(g)$$

$$Si_3N_4+(3)O_2 \rightarrow (3)SiO_2(s)+2N_2(g).$$

A conventional zirconia muffle furnace has sufficient oxygen, which is provided by ambient air leaking into the furnace, to form passivation layers on the contaminants through passive oxidation.

It has been further discovered, in connection with the present invention, that these passivation-layered contaminants act as low-stress break sources for the optical fibers.

The draw process of the present invention has been designed to remove these contaminants through active oxidation. The active oxidation mechanism produces a gaseous reaction product and thus corrodes the silicon carbide and silicon nitride contaminants. The active oxidation mechanisms for silicon carbide and silicon nitride are represented by the following formulas:

$$SiC(s)+O_2(g) \rightarrow SiO(g)+CO(g)$$

$$Si_3N_4(s)+(3/2)O_2(g) \rightarrow 3SiO(g)+2N_2(g).$$

Thus, by promoting active oxidation, the contaminants can be removed by corrosion. For example, graphite muffle furnaces produce fibers that do not contain passivation-layered contaminants because, it is believed, these furnaces promote active oxidation.

The oxygen concentration and the temperature of the environment determine whether the passive or active oxidation mechanism will predominate. For example, at a given temperature, the passive oxidation mechanism predominates for silicon carbide and silicon nitride when $P_{O2}>P_{CO+SiO}$, and the active oxidation mechanism predominates when $P_{CO+SiO}>P_{O2}$.

Accordingly, the present invention preferably promotes active oxidation by providing a low-oxygen environment in a drawing portion of a draw furnace. In a preferred mode, a low-oxygen environment is provided by introducing a reducing gas into the drawing portion that will react with oxygen to reduce the oxygen concentration. The reducing gas can be any gas that reacts readily with oxygen to reduce oxygen concentration and thereby create a benign gas, i.e., a gas that will not react with the blank or fiber.

Presently, carbon monoxide (CO) is the preferred reducing gas. The following experiments illustrate the effect of carbon monoxide on the environment in the drawing portion of a zirconia muffle furnace.

Initially, the oxygen concentration was measured while flowing commercially pure helium (He) through the muffle at varying rates. The results are shown in Table 1.

TABLE 1

| Helium Flow (S.L.P.M.) | % Oxygen |
|---|---|
| 0.0 | 21.80 |
| 0.8 | 21.70 |
| 2.25 | 15.00 |
| 3.50 | 2.85 |
| 4.50 | 1.91 |
| 5.35 | 1.55 |

Next, the oxygen concentration was measured while flowing a gas consisting of commercially pure helium and 10% carbon monoxide through the muffle at varying rates. The results are shown in Table 2.

TABLE 2

| Helium and Carbon Monoxide Flow (S.L.P.M.) | % Oxygen |
|---|---|
| 3.19 | 0.367 |
| 4.4 | 0.0845 |
| 4.9 | less than 0.00001 |
| 5.6 | less than 0.00001 |
| 14.3 | less than 0.00001 |

As shown by Tables 1 and 2, use of carbon monoxide as a reducing gas effectively reduces the oxygen concentration of the environment in the muffle.

The reduced oxygen environment improves the strength of fibers drawn in a zirconia muffle furnace, as shown by the following experiments.

Waveguide blanks were contaminated with a high concentration of silicon carbide contaminants. The mean particle size was 6.74 microns and the maximum size was 25 microns. Contaminants were deposited to achieve a coverage density of greater than 20 per square centimeter of blank surface.

The seeded blanks were drawn into fiber in a conventional zirconia muffle furnace. Under conventional operating conditions (helium purge gas only), the fiber was difficult to wrap after drawing, yielding lengths of only 200 to 400 meters between breaks. Strength testing of approximately 2 kilometers of fiber produced an average of approximately two low strength breaks per meter. Break source analysis confirmed that the breaks during wrapping and strength testing were due to silicon carbide contaminants blanketed with a layer of amorphous silica.

Next, carbon monoxide was added to the helium purge gas in the zirconia muffle furnace to reduce the oxygen concentration in accordance with the equation: $2CO+O_2 \rightarrow 2CO_2$. When the blanks were loaded into a furnace environment containing an appropriate amount of carbon monoxide in addition to the helium purge gas, the draw performance improved dramatically, yielding lengths of up to 65 kilometers between breaks. Strength testing of more than 200 kilometers of fiber and associated analysis of break ends showed that there were no low strength breaks due to silicon carbide.

Finally, the drawing process was commenced using only helium as the purge gas and carbon monoxide was added to the helium midway through the drawing process. Draw performance improved instantly and dramatically, with the fiber changing from being unwrappable (without carbon monoxide) to yielding wrappable lengths of greater than 100 kilometers (with carbon monoxide).

Similar testing with blanks contaminated with silicon nitride contaminants yielded similar results.

As shown by these experiments, the reduced oxygen environment created by the addition of carbon monoxide creates a passive to active oxidation transition. The contaminants corrode away due to active oxidation and do not form break sources.

A preferred embodiment of a draw furnace according to the present invention is shown in FIG. 1 and is designated generally by the reference numeral 10. In accordance with the invention, draw furnace 10 includes a drawing portion that has a refractory, oxide component and that heats a blank having a refractory contaminant to a fiber drawing temperature, and a supply device that supplies gas to the drawing portion to provide an environment in the drawing portion that causes active oxidation of the refractory contaminant.

As shown herein, the drawing portion 12 includes a zirconia muffle 14, which is a refractory, oxide component. The zirconia muffle distributes heat generated by a heating coil 16 that has passed through insulation 18. In the present invention, the integrity of the environment in the drawing portion has been improved by providing a high temperature ceramic glue (CERAMABOND #503, Armco Products) that forms a gas-tight seal between beaker top 20 and upper muffle extension 22, and a flat, closed-cell silicone gasket 24 (Material No. 7204, Groendyk Mfg. Co.) that forms a gas-tight seal between lower muffle extension 26 and Elmer tube 27.

A blank support rod 28 holds blank 30 in drawing portion 12. An O-ring 32 forms a seal between rod 28 and sealing member 34, which is formed of metallic foil or the like. Sealing member 34 connects to end cap 36, which itself is connected to annular member 38.

As shown herein, the supply device includes pipe 40 that extends through annular member 38. Pipe 40 is connected to gas supply 42 and supplies gas from gas supply 42 to the drawing portion 12, thereby providing an environment in drawing portion 12 that causes active oxidation of the refractory contaminant and inhibits passive oxidation.

Pipe 40 preferably flows gas through muffle 14 at a constant flow rate of 2 to 5 standard liters per minute. The flow rate can be altered based on factors such as the flow rate needed to maintain control of fiber attributes.

Preferably, the gas supply 42 supplies a purge gas containing a reducing gas that reacts with oxygen to lower the oxygen concentration of the environment of the drawing portion. More preferably, the purge gas consists of helium and carbon monoxide. Carbon monoxide reacts with oxygen to produce carbon dioxide ($CO_2$), thus reducing the oxygen concentration in the environment.

When using the preferred purge gas, the gas supply 42 can be, for example, a reservoir of both helium and carbon monoxide or separate reservoirs of helium and carbon monoxide, the outputs of which are combined before or as they enter the draw furnace. In view of the toxic nature of carbon monoxide, however, it may be preferable to use an external furnace that produces carbon monoxide by reaction and, therefore, renders unnecessary a reservoir of carbon monoxide.

FIG. 1 diagrammatically illustrates such an external furnace 70. The external furnace 70 includes a reactive material 72 that reacts with at least a gas of a non-toxic gas mixture (provided by unillustrated gas reservoir(s)) to produce carbon monoxide. The reactive material 72 can be a porous carbon or graphite material (such as a carbon honeycomb substrate manufactured by Corning Incorporated, e.g., part no. K2225) through which the non-toxic gas mixture can be passed.

The non-toxic gas mixture preferably contains helium and a reactive gas. The reactive gas, which can be, for example, carbon dioxide or oxygen, will react with the carbon material 72 to produce carbon monoxide. The desired amount of carbon monoxide (preferably about 2% by volume) can be produced by manipulating the reactive gas concentration and the reaction temperature (the external furnace 70 preferably operates at atmospheric pressure).

When the reactive gas is carbon dioxide, the equilibrium reaction is:

$$CO_2 + C = 2CO.$$

This reaction proceeds to near completion (more than 95% conversion) at 1000° C. and atmospheric pressure.

When the reactive gas is oxygen, two competing reactions occur:

$$O_2 + C = CO_2$$

$$O_2 + 2C = 2CO$$

The reaction producing carbon monoxide is favored at high temperatures and low oxygen pressures. At 1000° C. and atmospheric pressure ($P_{O2}$<0.05), thermodynamic equilibrium predicts that the $CO:CO_2$ ratio should be greater than 100:1. This ratio may be decreased if gas flow rates are fast enough to cause an incomplete reaction. However, the typical flow rate for a zirconia draw furnace (4.5 standard liters per minute) is slow enough to ensure that the reaction is not kinetically limited. This is true when either carbon dioxide or oxygen is the reactive gas.

Since the preferred non-toxic gas mixtures will have to be heated to produce the desired amount of carbon monoxide, the external furnace 70 will preferably include a heating device. The heating device can include a muffle 74 that distributes heat generated by a heating coil 76 to heat the gas to a preferred temperature of 100°C. The muffle 74 may be made with alumina, but can be any material that will withstand relatively high temperatures and will not react with gas flowing through the external furnace 70.

Accordingly, the external furnace 70 can provide a purge gas containing carbon monoxide without the risks inherent in maintaining a reservoir of carbon monoxide.

The purge gas preferably contains only as much carbon monoxide as is necessary to provide an oxygen concentration that promotes active oxidation. The amount of carbon monoxide required can be theoretically determined by, for example, calculating the amount of carbon monoxide required to cause $P_{CO}$ (after introducing carbon monoxide) to be greater than $P_{O2}$ (before introducing carbon monoxide). Present zirconia muffle furnaces require approximately 2 to 5% carbon monoxide in the purge gas to meet this requirement. Also, the necessary amount of carbon monoxide can be determined by measuring the oxygen concentration in the drawing portion and adjusting the amount of carbon monoxide until the appropriate oxygen concentration is achieved. It is presently contemplated that a delta-F electrolyte detector can be used to measure the oxygen concentration in the drawing portion.

A conventional drawing mechanism (not shown) can be used to draw a fiber from the blank in the environment in the drawing portion. A slow drawing speed is better for ablating contaminants, but the particular drawing speed chosen can also depend on other factors such as the furnace type and the product type.

A holding oven has been designed to improve the efficiency of the above-described process. This holding oven and its use in conjunction with a drawing furnace are disclosed and claimed in a U.S. Application by J. E. Dickinson, D. J. Wissuchek, J. A. Snipes, J. L. Dunn, B. W. Reding, and G. S. Glaesemann and entitled Apparatus and Method for Inhibiting Passive Oxidation of a Contaminant in a Blank Used for Drawing an Optical Waveguide Fiber (Attorney docket no. A-8614), filed concurrently herewith, the disclosure of which is hereby incorporated by reference.

A passivation layer formed on a contaminant before a blank enters the draw furnace may inhibit corrosion of the contaminant by active oxidation in the drawing process. The passivation layer hinders the reaction by creating a diffusive barrier for oxidation reactants and products. For example, the reaction rate for the corrosion of silicon carbide and silicon nitride is governed by the rate of diffusion of carbon monoxide or nitrogen through the passivation layer.

Thus, for blanks having a contaminant with a passivation layer, the draw process must supply sufficient time under active oxidation conditions to ablate the contaminant with its passivation layer. If the passivation layer is sufficiently thick, the drawing process may not fully remove the contaminant or may remove it so slowly that the process is not practical.

Figure 2:
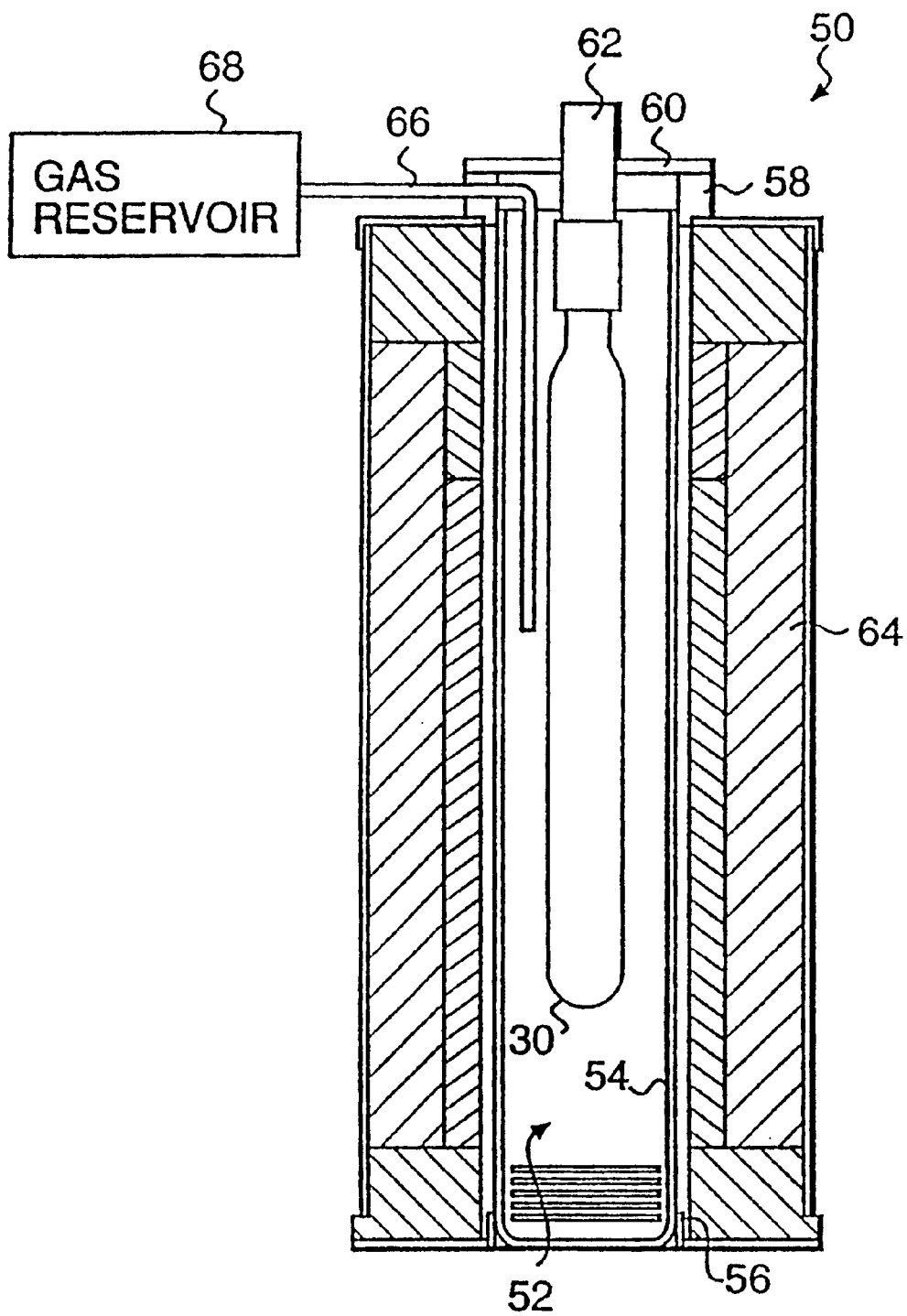
FIG. 2 is a sectional view of a holding oven.

The improved holding oven inhibits passive oxidation of contaminants and prevents the formation of a passivation layer. An embodiment of the improved holding oven is shown in FIG. 2 and is designated generally by reference numeral 50. Holding oven 50 is a conventional holding oven that has been modified to provide an environment that inhibits passive oxidation of contaminants. Holding oven 50 includes a compartment for storing a blank, and a supply device that supplies gas to the compartment that provides an environment in the compartment that inhibits passive oxidation of a refractory contaminant of the blank.

As shown herein, compartment 52 for storing blank 30 includes muffle 54 that is centered by centering ring 56 and top seal 58. The top of compartment 52 is covered by top seal 58 and cover 60. A handle 62 extends through cover 60 to hold blank 30. Heaters and insulation 64 maintain the compartment 52 at an appropriate temperature, preferably about 950° C.

In the form shown, the supply device includes a pipe 66 that extends into compartment 52 through top seal 58. Pipe 66 is connected to a gas reservoir 68 and supplies the gas from reservoir 68 to compartment 52, thereby creating an environment that inhibits passive oxidation of the contaminant.

The gas in reservoir 68 preferably is commercially pure argon (Ar), which has an oxygen concentration of less than 0.1 part per million (ppm). Argon provides a clean environment by preventing other impurities from getting onto the blank. Also, argon weighs more than air and, therefore, will remain in an uncovered compartment. Other benign gases can be selected, such as commercially pure nitrogen ($N_2$), which has an oxygen concentration of approximately 80 ppm.

The argon gas is preferably flowed through the compartment at a constant flow rate of 0.5 to 1.0 standard liters per minute.

It will be apparent to those skilled in the art that various modifications and variations can be made in the method and apparatus of the present invention without departing from the scope or spirit of the invention. For example, although a preferred embodiment has been described with reference to the drawing of optical waveguide fibers from silica-containing blanks, certain aspects of the invention may be applied to the drawing of fibers of other suitable materials. As a further example, although the invention has been described with reference to silicon carbide and silicon nitride contaminants, the invention may be used for other oxidizable, refractory contaminants, such as tungsten carbide.

Other embodiments of invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of producing a fiber in a drawing device having a refractory, oxide component in a drawing portion, comprising the steps of:
   disposing a blank having a refractory contaminant in the drawing portion;
   providing an environment in the drawing portion that causes oxidation of the contaminant to form a gaseous reaction product; and
   drawing a fiber from the blank in the environment.

2. The method of claim 1, wherein the refractory, oxide component comprises a refractory, oxide muffle.

3. The method of claim 2, wherein the refractory, oxide muffle includes zirconia.

4. The method of claim 1, wherein the contaminant includes a silicon compound.

5. The method of claim 4, wherein the silicon compound is at least one selected from a group consisting member from a group comprised of silicon carbide and silicon nitride.

6. The method of claim 1, wherein the step of providing the environment comprises providing a purge gas containing a reducing gas.

7. The method of claim 6, wherein the reducing gas comprises carbon monoxide.

8. The method of claim 6, wherein the purge gas containing a reducing gas comprises helium and carbon monoxide.

9. The method of claim 1, wherein the fiber includes silicon.

10. The method of claim 1, wherein the fiber is an optical waveguide fiber.

11. The method of claim 10, wherein the contaminant includes a silicon compound.

12. The method of claim 11, wherein the refractory, oxide component comprises a zirconia muffle.

13. The method of claim 11, wherein the step of providing the environment comprises providing carbon monoxide.

14. A method of reducing refractory, contaminant break sources of a fiber drawn from a blank disposed in a drawing portion of a drawing device, the drawing portion having a refractory, oxide component, comprising the step of:
   providing an environment in the drawing portion that causes oxidation of the contaminant break source to remove the contaminant break source by corrosion.

15. The method of claim 14, wherein the refractory, oxide component comprises a refractory, oxide muffle.

16. The method of claim 15, wherein the refractory, oxide muffle includes zirconia.

17. The method of claim 14, wherein the contaminant break source includes a silicon compound.

18. The method of claim 17, wherein the silicon compound is at least one selected from a group consisting member from a group comprised of silicon carbide and silicon nitride.

19. The method of claim 14, wherein the step of providing the environment comprises providing a purge gas containing a reducing gas.

20. The method of claim 19, wherein the reducing gas comprises carbon monoxide.

21. The method of claim 14, wherein the step of providing the environment comprises providing helium and carbon monoxide.

22. The method of claim 14, wherein the fiber includes silicon.

23. The method of claim 14, wherein the fiber is an optical waveguide fiber.

24. The method of claim 23, wherein the contaminant break source includes a silicon compound.

25. The method of claim 24, wherein refractory, oxide comprises a zirconia furnace muffle.

26. The method of claim 24, wherein the step of providing the environment comprises providing a purge gas containing carbon monoxide.

27. A method of removing an oxidizable, refractory contaminant from a blank disposed in a fiber drawing device having a refractory, oxide component in a drawing portion, comprising the step of:
   providing an environment in the drawing portion that causes oxidation of the contaminant to form a gaseous reaction product and suppresses passive oxidation of the contaminant.

28. The method of claim 27, wherein the refractory, oxide component comprises a refractory, oxide muffle.

29. The method of claim 28, wherein the refractory, oxide muffle includes zirconia.

30. The method of claim 27, wherein the contaminant includes a silicon compound.

31. The method of claim 30, wherein the silicon compound is at least one selected from a group consisting member from a group comprised of silicon carbide and silicon nitride.

32. The method of claim 27, wherein the step of providing the environment comprises providing a purge gas containing a reducing gas.

33. The method of claim 32, wherein the reducing gas comprises carbon monoxide.

34. The method of claim 32, wherein the step of providing the environment comprises providing helium and carbon monoxide.

35. The method of claim 27, wherein the fiber includes silicon.

36. The method of claim 27, wherein the fiber is an optical waveguide fiber.

37. The method of claim 36, wherein the contaminant includes a silicon compound.

38. The method of claim 37, wherein the drawing device is comprised of a furnace having a zirconia muffle.

39. The method of claim 37, wherein the step of providing the environment includes providing carbon monoxide.

40. A method of drawing a fiber from a blank in a drawing device having a refractory, oxide component in a drawing portion, comprising the steps of:

inhibiting passive oxidation of an oxidizable, refractory contaminant in the blank;

promoting oxidation of the contaminant to form a gaseous reaction product; and drawing the fiber from the blank.

41. The method of claim 40, wherein the contaminant includes a silicon compound.

42. The method of claim 41, wherein the silicon compound is at least one member selected from a group consisting of silicon carbide and silicon nitride.

43. The method of claim 40, wherein the blank includes silicon.

44. The method of claim 40, wherein the fiber is an optical waveguide fiber.

* * * * *